(12) United States Patent
Maftuleac et al.

(10) Patent No.: US 10,984,029 B2
(45) Date of Patent: Apr. 20, 2021

(54) MULTI-LEVEL DIRECTORY TREE WITH FIXED SUPERBLOCK AND BLOCK SIZES FOR SELECT OPERATIONS ON BIT VECTORS

(71) Applicant: SAP SE, Walldorf (DE)

(72) Inventors: Daniela Maftuleac, Walldorf (DE); Alejandro Lopez-Ortiz, Walldorf (DE); Jeffrey Pound, Walldorf (DE); Alejandro Salinger, Walldorf (DE)

(73) Assignee: SAP SE, Walldorf (DE)

( * ) Notice: Subject to any disclaimer, the term of this patent is extended or adjusted under 35 U.S.C. 154(b) by 408 days.

(21) Appl. No.: 15/380,970

(22) Filed: Dec. 15, 2016

(65) Prior Publication Data

US 2018/0173710 A1    Jun. 21, 2018

(51) Int. Cl.
G06F 16/00     (2019.01)
G06F 16/33     (2019.01)
G06F 16/31     (2019.01)
G06F 16/22     (2019.01)

(52) U.S. Cl.
CPC ...... *G06F 16/3347* (2019.01); *G06F 16/2237* (2019.01); *G06F 16/322* (2019.01)

(58) Field of Classification Search
CPC ............... G06F 16/3347; G06F 16/332; G06F 16/2237; G06F 15/8092; G06F 16/95; G06F 16/951; G06F 16/10; G06F 16/11; G06F 16/113; G06F 16/13; G06F 16/164; G06F 16/18; G06F 16/22
See application file for complete search history.

(56) References Cited

U.S. PATENT DOCUMENTS

| | | | | |
|---|---|---|---|---|
| 5,276,874 A | * | 1/1994 | Thomson | G06F 16/9017 |
| 5,799,300 A | * | 8/1998 | Agrawal | G06F 16/24556 |
| 5,828,876 A | * | 10/1998 | Fish | G06F 16/1858 |
| 6,098,066 A | * | 8/2000 | Snow | G06F 16/93 |
| 6,278,992 B1 | * | 8/2001 | Curtis | G06F 16/2237 |
| | | | | 707/711 |
| 2002/0156840 A1 | * | 10/2002 | Ulrich | G06F 16/10 |
| | | | | 709/203 |

(Continued)

OTHER PUBLICATIONS

WO-2011128454-A1 (Year: 2011).*

(Continued)

*Primary Examiner* — Mark D Featherstone
*Assistant Examiner* — Kweku William Halm
(74) *Attorney, Agent, or Firm* — Mintz, Levin, Cohn, Ferris, Glovsky and Popeo, P.C.

(57) ABSTRACT

A bit vector having a bit vector length is accessed. A select operator directory tree can be generated using the bit vector. The select operator directory tree includes a first level of superblocks including large superblocks and small superblocks, a second level of blocks including large blocks and small blocks, each block associated with one of the superblocks, and a third level of sub-blocks, each sub-block associated with a block. The large superblocks each have, a length greater than a first constant that is independent of the bit vector length and the large blocks each have a length greater than a second constant that is independent of the bit vector length. The select operator directory tree can be stored. Related apparatus, systems, techniques and articles are also described.

19 Claims, 8 Drawing Sheets

(56) References Cited

U.S. PATENT DOCUMENTS

| | | | |
|---|---|---|---|
| 2013/0254201 A1* | 9/2013 | Hatamoto | G06F 16/9027 707/737 |
| 2014/0095458 A1* | 4/2014 | Kim | G06F 16/2255 707/698 |
| 2016/0378803 A1* | 12/2016 | Hopcroft | G06F 16/316 707/745 |

OTHER PUBLICATIONS

Henry G. Baker, "Efficient Implementation of bit-vector operation in Common Lisp", ACM SIGPLAN Lisp Pointers, vol. III, Issue 2-4, p. 8-22 (Year: 1990).*

Navarro, Gonzalo, "Compact Data Structures: A Practical Approach," Cambridge University Press, Paragraph 4.2.2 'Constant Time', Nov. 30, 2016.

K. Sadakane, *Succinct Representations of Icp Information and Improvements in the Compressed Suffix Arrays*, Proceeding of Symposium on Discrete Algorithms (SODA'02), pp. 225-232, 2002.

M. Bender and M. Farach-Colton, The LCA Problem Revisited, In Proceedings of LATIN2000, LNCS 1776, pp. 88-94, 2000.

K. Sadakane, Compressed Suffix Trees with Full Functionality, Journal Theory of Computing Systems, vol. 41(4), pp. 589-607, 2007.

K. Sadakane, Succinct data structures for flexible text retrieval systems, Journal of Discrete Algorithms, vol. 5(1), pp. 12-22, 2007.

D. Clark, Compact Pat Trees, PhD thesis, p. 30-34.

S. Gog and M. Petri, Optimized Succint Data Structures for Massive Data, In Journal Software—Practice and Experience, vol. 44(11), pp. 1287-1314, 2014.

G. Navarro, Spaces, trees and colors: The algorithmic landscape of document retrieval on sequences, ACM Comput. Surv. 46, 4, Article 52 (Mar. 2014).

P. Ferragina and G. Manzini, Indexing Compressed Text, 2005.

S. Muthukrishnan, Efficient algorithms for document retrieval problems, 2002.

R. Gonzales et al., Practical implementation of Rank and Select queries, 2005.

A. Golynski, J.I. Munroand S.S. Rao, Rank/Select Operations on Large Alphabets: a Tool for Text Indexing, 2006.

* cited by examiner

MULTI-LEVEL DIRECTORY TREE WITH FIXED SUPERBLOCK AND BLOCK SIZES FOR SELECT OPERATIONS ON BIT VECTORS

TECHNICAL FIELD

The subject matter described herein relates to a multi-level directory tree with fixed superblock and block sizes for select operations on bit vectors.

BACKGROUND

The amount of textual data stored by corporate enterprises has increased significantly in the last decades. A database must provide an efficient way of retrieving relevant information from this data. This task can be formalized as the document retrieval problem. For large text databases a sequential search over the contents is prohibitively slow.

SUMMARY

In an aspect, a bit vector having a bit vector length is accessed. A select operator directory tree can be generated using the bit vector. The select operator directory tree includes a first level of superblocks including large superblocks and small superblocks, a second level of blocks including large blocks and small blocks, each block associated with one of the superblocks, and a third level of sub-blocks, each sub-block associated with a block. The large superblocks each have a length greater than a first constant that is independent of the bit vector length and the large blocks each have a length greater than a second constant that is independent of the bit vector length. The select operator directory tree can be stored.

In another aspect, data characterizing a bit vector and a bit-select value is received. A select operator directory tree is searched for a position of a bit-select value occurrence of a bit-type. The select operator directory tree includes a first level of superblocks including large superblocks and small superblocks, a second level of blocks including large blocks and small blocks, each block associated with one of the superblocks, and a third level of sub-blocks, each sub-block associated with a block. The large superblocks each have a length greater than a first constant that is independent of a bit vector length and the large blocks each have a length greater than a second constant that is independent of the bit vector length. The position of the bit-select value occurrence of the bit-type is provided.

One or more of the following features can be included in any feasible combination. For example, blocks associated with large superblocks can characterize explicit positions of a bit-type of the bit vector. Blocks associated with small superblocks can characterize locations of sub-blocks. The sub-blocks associated with the large blocks can characterize explicit positions of the bit-type of the bit vector. Sub-blocks associated with small blocks can characterize a cumulative number of occurring bit-types in a portion of the bit vector.

The first level of superblocks can be represented as at least a first level array storing a location of a predetermined occurrence of a bit-type in the bit vector. The second level of blocks can be represented as at least a plurality of second level arrays. The third level of sub-blocks can be represented as at least a plurality of third level arrays.

Generating the select operator directory tree can include: determining a boundary of each superblock in the bit vector as a predetermined occurrence of a bit-type in the bit vector; determining whether each superblock is large or small based on whether a given superblock has a length greater than the first constant that is independent of the bit vector length; storing explicit positions of the bit-type of each large superblock in each associated block; determining a boundary of each block associated with a small superblock in the bit vector; determining whether each block associated with the small superblocks is large or small based on whether a given block has a length greater than the second constant that is independent of the bit vector length; storing explicit positions of the bit-type of each large block in each associated sub-block; and storing, in each respective sub-block associated with each respective large block, a cumulative number of occurring bit-types in an associated portion of the bit vector. The predetermined occurrence of the bit-type in the bit vector defining the boundary of each superblock can be $2^{12}$. The first constant that is independent of the bit vector length can be equal to $2^{20}$. The second constant that is independent of the bit vector length can be equal to $2^{14}$.

The bit-type can a 0 bit or a 1 bit. The bit vector is an array of 0 and 1 bits.

The searching can include: determining if the bit-select value is contained in the first level array; determining, using the first level array, a superblock having the bit-select value occurrence of the bit-type; determining one of the plurality of second level arrays associated with the determined superblock; determining if the bit-select value is contained in the determined one of the plurality of second level arrays; determining one of the plurality of the third level arrays associated with the determined second level array having the bit-select value occurrence of the bit-type; and determining a position of the bit-select value occurrence of the bit-type from the determined one of the plurality of the third level arrays.

A bit-select operation can be performed during a text search engine operation.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various indicate like elements.

DETAILED DESCRIPTION

The current subject matter relates to a multi-level directory tree with fixed superblock and block sizes for select operations on bit vectors. The multi-level directory tree is three levels and includes superblocks, blocks, and sub-blocks. A superblock is considered large when its length (e.g., the number of bits it contains) is greater than a constant value that is independent of the bit vector length. Similarly, blocks can be considered large when its length is greater than a second constant value that is independent of the bit vector length. Creating a select operation directory tree using definitions of large/small superblocks and large/small blocks that are fixed and independent of the length of the bit vector reduces the used space (e.g., overhead) of the directory tree data, structure. In addition, the directory tree data structure can enable a select query having constant time per query.

Figure 1:
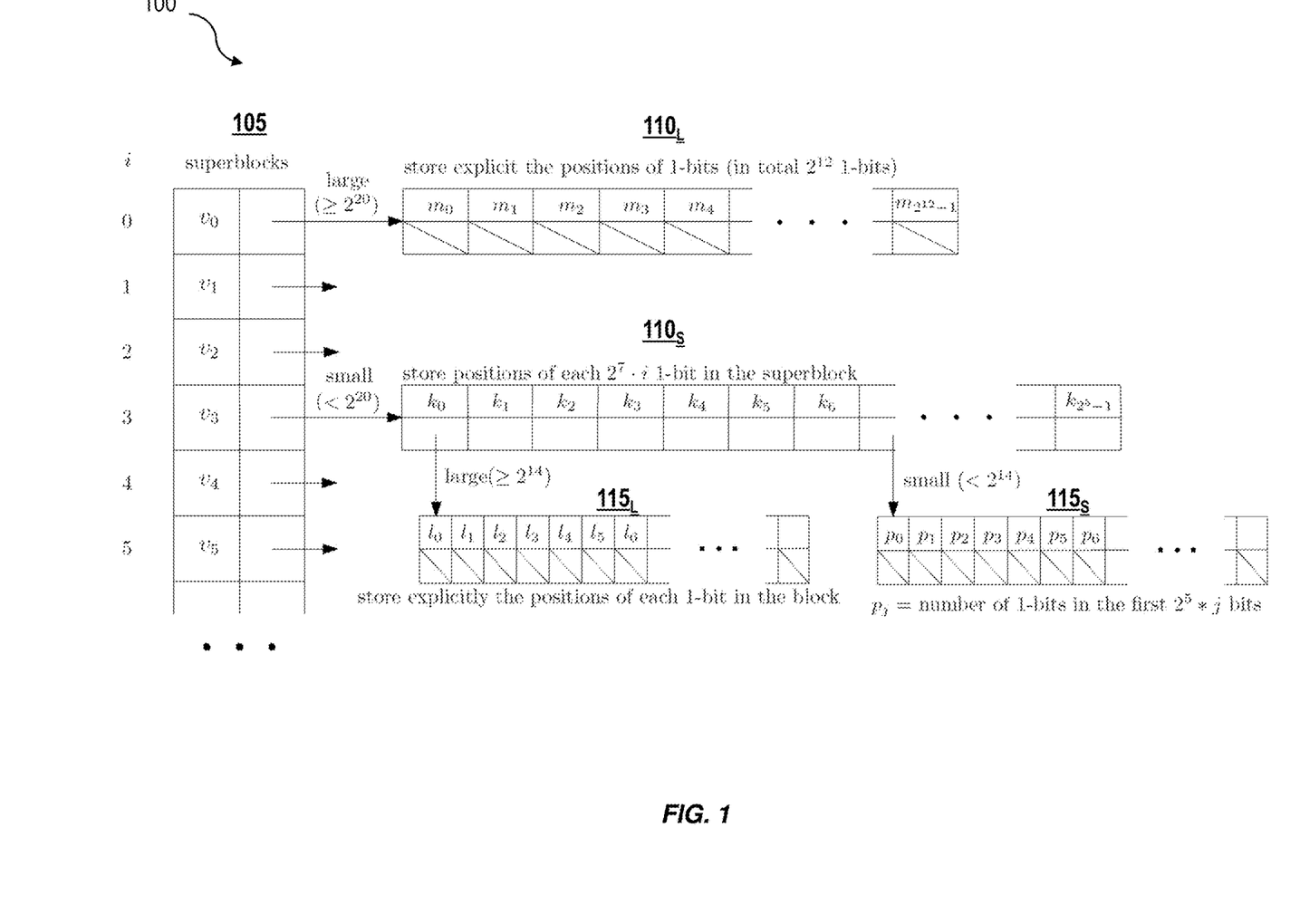
FIG. 1 is a diagram illustrating an example directory tree for select operations that reduces overhead and enables constant time queries.

FIG. 1 is a diagram illustrating an example directory tree 100 for select operations that reduces overhead and enables constant time queries. A select operation on a bit vector B (denoted $Select_c(B,i)$) returns the position in the sequence B of the $i^{th}$ occurrence of character c. For example, $Select_1(B,i)$ finds the position in the bit vector B of the $i^{th}$ 1-bit. Such a select operation is often simply written as Select(B,i). The directory tree 100 according to the current subject matter enables efficient select operations in that the select operation can be performed in constant time per query (e.g., the time to execute the query does not increase with the length of bit vector B) and reduces the required overhead for storing the directory 100 data structure.

Instead of storing an array containing the positions of the i-th 1-bit for all i, which is long and has big values, the directory tree 100 includes a top level to store a relatively short array but with large values. Then, at a second level, a longer array is used with smaller values compared to the top level. Finally, at the third level an even longer array is stored with very small values. The current subject matter can provide a useful tradeoff between the length of an array at each level and the size of its values.

Concretely and as illustrated in FIG. 1, the select operator directory tree includes a first level 105 that divides the bit vector B of length n in superblocks by storing the position of every $i^{th}$ occurrence of a 1-bit. Thus, the variable i is a predetermined occurrence of a bit-type in the bit vector. Just using this top-level structure Select queries can be answered for every $i^{th}$ 1-bit directly. The value of i may be configured but is constant within a given directory tree. The specific superblock, block sub-block sizes and other values illustrated in FIG. 1 are provided as examples and other values are possible.

There are two types of superblocks: a superblock is large if it contains more than a constant value of bits (e.g., sparse) and is small otherwise (e.g., dense). The constant value of bits that defines whether a superblock is large or small can be independent of a length of the bit vector. For example, the constant value can be $2^{20}$. This definition of large/small blocks is in contrast to one based on a function of the bit vector length such as $(\log_2 n)^2$. While superblock lengths can vary, each superblock contains the same number of 1-bits. For example, each superblock can contain exactly $2^{11}$ (4096) 1-bits.

The directory tree 100 includes a second level of blocks ($110_L$ and $110_S$). For each large superblock, an associated second level block $110_L$ stores explicitly the positions of each 1-bit of the superblock with a local index superblock). These blocks are leaves within the directory tree 100. If the superblock is small, then the second level blocks $110_S$ can store the position of each $2^7$-th 1-bit in the first level 105 (superblock) using local (and thus smaller) indexes. A second level block is considered large if its length is greater than a constant value of bits (e.g., sparse) and is small otherwise (e.g., dense). The constant value of bits can be independent of the bit vector length. For example, a block can be considered large when its length is greater than $2^{14}$, otherwise the block is considered small.

The directory tree 100 includes a third level of sub-block ($115_L$ and $115_S$). For every large block, the positions in the block of each 1-bit can be stored explicitly at the third level $115_L$ using local coordinates (e.g., a local index). If the block is small, the cumulative number of 1-bits in the block (e.g., portion of the bit vector) up to the beginning of each sub-block of a fixed length, for example $2^5$, can be stored at the third level $115_S$.

As described above, the directory tree 100 data structure includes a first level of superblock including large superblocks and s all superblocks. The directory tree 100 data structure includes a second level of blocks include large blocks and small blocks with each block associated with one of the superblocks. When a block is associated with a large superblock, it stores the explicit positions of a bit-type (e.g., 1 or 0) of the bit vector using a local index.

The directory tree 100 data structure includes a third level of sub-blocks where each sub-block is associated with a small block. Blocks associated with small superblocks store positions or boundaries of sub-blocks. Sub-blocks associated with large blocks store the explicit positions of a bit-type (e.g., 1 or 0) of the bit vector using a local index. The sub-blocks associated with small blocks stores the cumulative number of occurring bit-types (e.g., 1's or 0's) in a position of the bit vector.

In some implementations, the directory tree 100 can be represented using arrays where the first level is a first array representing the superblocks, the second level includes multiple arrays representing the blocks, and the third level includes multiple arrays representing the sub-blocks.

Although the above describes select operations counting the number of 1-bits, it is contemplated that an alternative bit-type can be used (e.g., count number of 0's).

Figure 2:
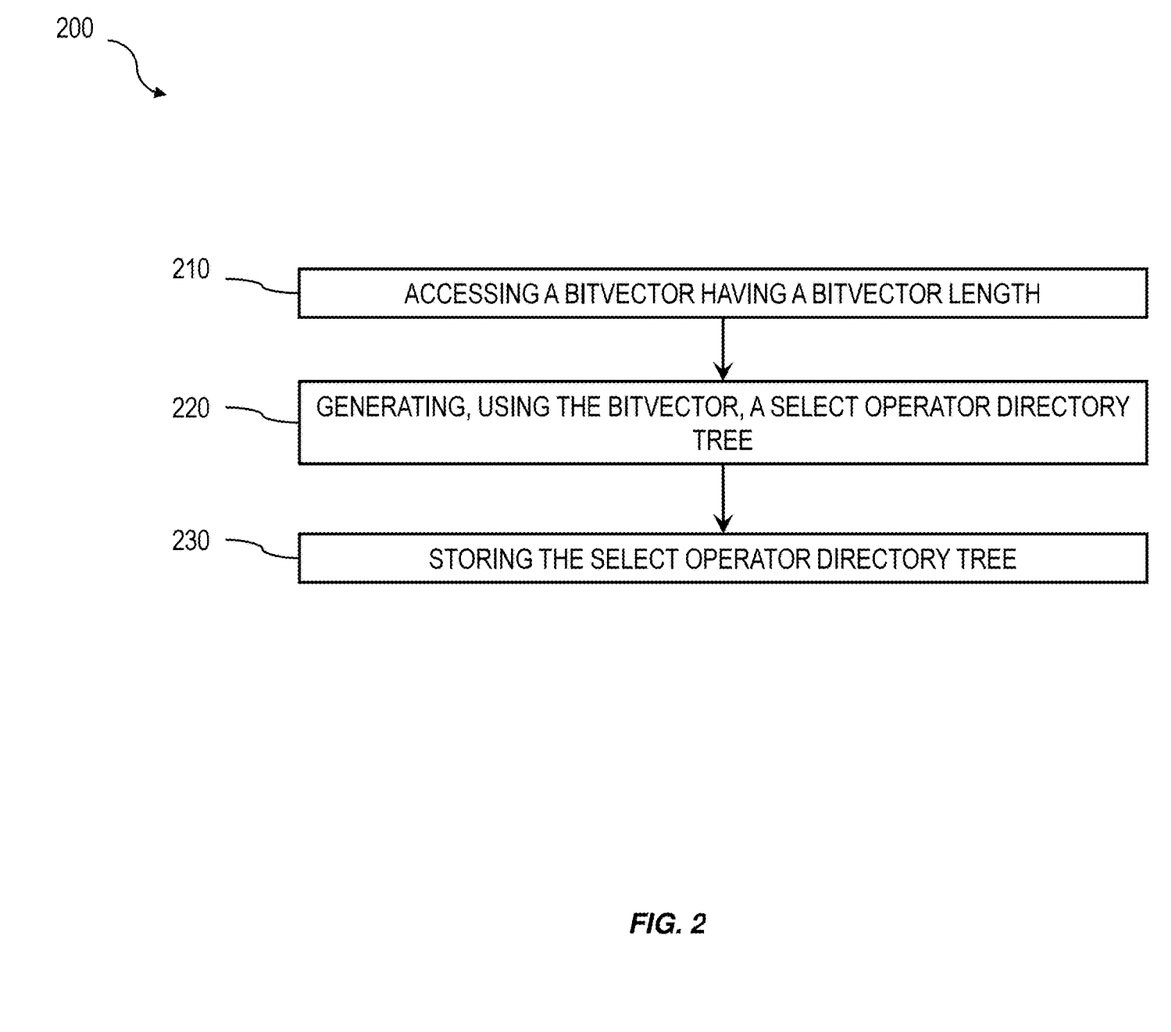
FIG. 2 is a process flow diagram of a method of creating a directory tree data structure for select operations according to the current subject matter.

FIG. 2 is a process flow diagram of a method 200 of creating a directory tree 100 data structure for select operations according to the current subject matter. The directory tree 100 can use definitions of large/small superblocks and large/small blocks that are fixed and independent of the length of the bit vector reduces the used space (e.g., overhead) of the directory tree data structure. In addition, the directory tree data structure can enable a select query having constant time per query.

At 210, a bit vector is accessed. The bit vector can be accessed from memory. At 220, the select operator directory tree is generated using the bit vector. The select operator directory tree includes the data structure as described with reference to FIG. 1.

At 230, the select operator directory tree is stored. The select operator directory tree can be stored into memory for access to process a select operator query.

Figure 3:
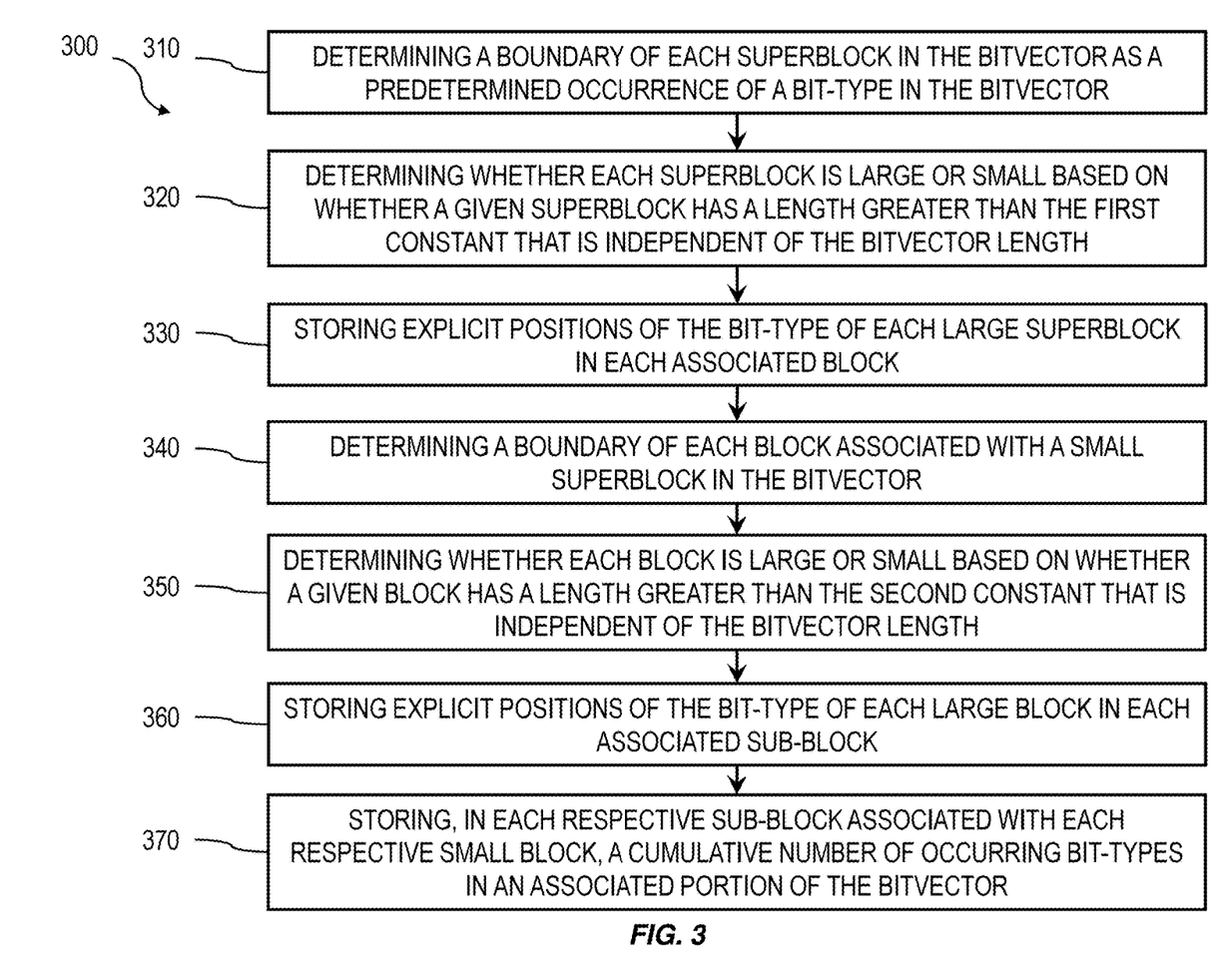
FIG. 3 is a process flaw diagram illustrating a method of generating the select operator directory tree.

FIG. 3 is a process flow diagram illustrating a method 300 of generating the select operator directory tree. At 310, a boundary of each super block in the bit vector is determined. The boundary of each superblock can be a predetermined occurrence of a bit-type (e.g., 1-bit or 0-bit) in the bit vector. The predetermined occurrence can be, for example, a constant such as $2^{12}$. The superblock boundaries can be stored in a first level array.

At 320, whether each superblock is large or small can be determined based on whether a given super block has a length greater than a constant that is independent of the bit vector length. For example, the constant can be $2^{20}$. This determination is in contrast to determining whether each superblock is large or small based on a function of the bit vector length such as $(\log_2 n)^2$.

At 330, explicit positions of the bit-type of each large superblock can be stored. The explicit positions can be stored using a local index. The explicit positions can be stored in a second level array.

At 340 a boundary of each block associated with a small superblock in the bit vector can be determined. The boundary of each block can be a predetermined occurrence of a bit-type (e.g., 1-bit or 0-bit) in the superblock. The predetermined occurrence can be, for example, a constant such as $2^7$.

At 350, whether each block associated with the small superblocks is large or small can be determined. The determination can be based on whether a given block has a length greater than a constant that is independent of the bit vector length. For example, the constant can be $2^{14}$. This determination is in contrast to determining whether each superblock is large or small based on a function of the bit vector length such as $(\log_2 n)_4$.

At 360, explicit positions of the bit-type of each large block can be stored. The explicit positions can be stored using a local index. The explicit positions can be stored in a third level array.

At 370, a cumulative number of occurring bit-types in an associated portion of the bit vector can be stored. The cumulative number can be a count of the occurrence of a bit-type (e.g., 1-bit or 0-bit) in a portion of the small block. For example, the cumulative number can be the number of 1-bits in every $2^5$ (32) bits. The cumulative number of occurring bit-types can be stored in a third level array.

The directory tree 100 can be utilized during a select query to provide a result in constant time. A query provides a bit-select value (e.g., i) as input and requires the position of the bit-select value ($i^{th}$) occurrence in the bit vector as output. To execute the query, one, two or three levels of the directory tree 100 are accessed. In the worst (e.g., slowest) case if the query belongs to a small superblock, small block of the superblock, and small sub-block of the superblock, then a binary search in the counters of the sub-blocks and a linear scan in the sub-block of $2^5$ bits are performed. The number of counters in the search is at most $2^9$ when the constant to determine if a block is large is $2^{14}$ and sub-blocks have $2^5$ bits.

Figure 4:
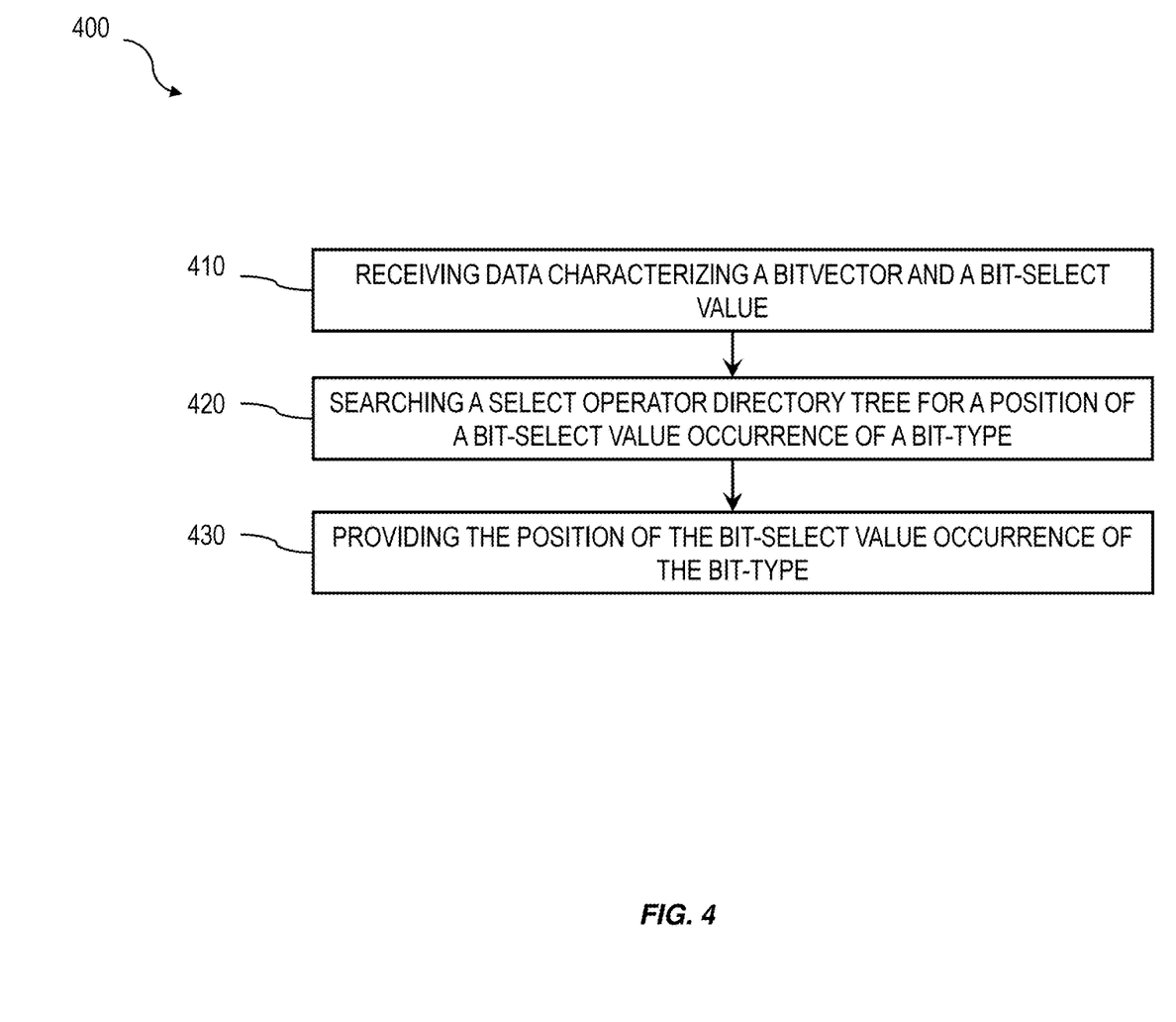
FIG. 4 is a process flow diagram illustrating a method of executing a select operation using a directory tree of the current subject matter.

FIG. 4 is a process flow diagram illustrating a method 400 of executing a select operation query using a directory tree 100 of the current subject matter. The directory tree 100 can use definitions of large/small superblocks and large/small blocks that are fixed and independent of the length of the bit vector reduces the used space (e.g., overhead) of the directory tree data structure.

At 410, data is received characterizing a bit vector and a bit-select value. The data can be received as a function call within a search engine, for example, a bit-select operation can be performed during a text search engine operation. Bit-type (e.g., 0 or 1) can also be received. A select operator directory tree 100 can be accessed from memory.

At 420, the select operator directory tree can be searched for a position of the bit-select value occurrence of a bit-type. The select operator directory tree includes the data structure as described with reference to FIG. 1.

At 430, the position of the bit-select value occurrence of the bit-type can be provided. The providing can include persisting, processing, transmitting and displaying the position.

Figure 5:
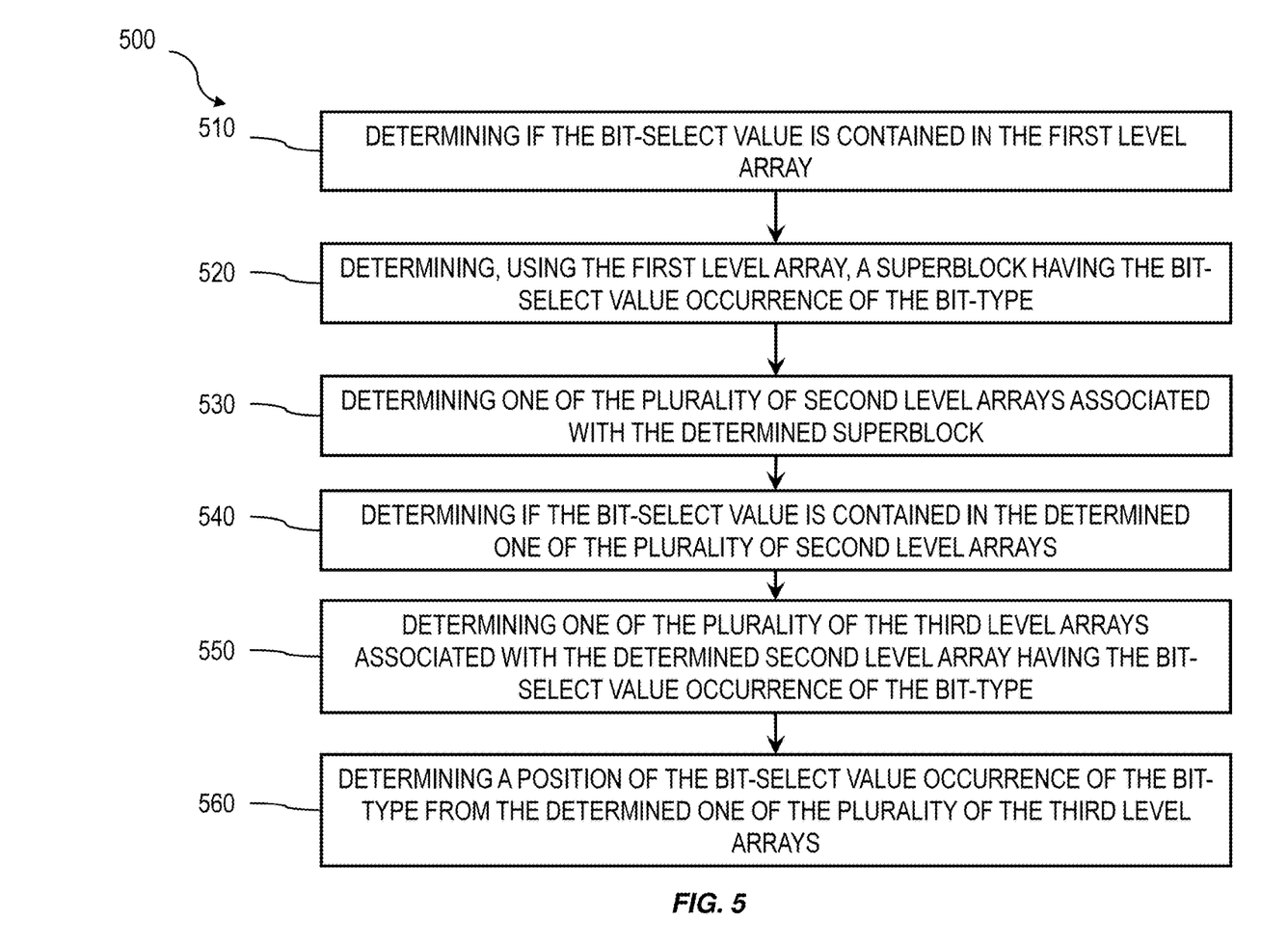
FIG. 5 is a process flow diagram illustrating a method of searching a select operator directory tree providing constant time per query.

FIG. 5 is a process flow diagram illustrating a method 500 of searching a select operator directory tree 100 providing constant time per query. At 510, the first level in the directory tree 100 is accessed to determine if the superblock boundaries include the bit-select value.

At 520, a superblock including the bit-select value occurrence of bit-type is determined using the first level array (for example by determining whether the bit-select value falls between the superblock boundaries stored in the first level array).

At 530, one of the second level arrays associated with the determined superblock is determined. The determined second level array is a child of the determined superblock.

At 540, whether the bit-select value is contained in the determined one of the plurality of second level arrays is determined. The determination may be performed by, for example, examining whether the bit-select value appears as an entry in the array or falls between values in the array.

At 550, one of the third level arrays associated with the determined second level array having the bit-select value occurrence of the bit-type is determined. At 560, a position of the bit-select value occurrence of the bit-type from the determined one of the third level arrays is determined.

Text Searching

The select operator directory tree 100 described herein can be implemented as a data structure for efficiently enabling a select operation in a text search engine. The search engine can search in database tables and in file document collections, for example, of an enterprise database system. Such a system can include the SAP HANA Vora, which is an in-memory query engine providing enriched interactive analytics on stored data. It leverages and extends the Apache Spark execution framework to provide enriched interactive analytics on enterprise and Hadoop data.

The amount of textual data stored by corporate enterprises has increased significantly in the last decades. A database must provide an efficient way of retrieving relevant information front this data. This task can be formalized as the document retrieval problem. For large text databases a sequential search over the contents is prohibitively slow.

Given a collection of documents and a user that requires information from this collection through queries, the goal is to retrieve the documents that match each query. A search engine is a system that solves this problem efficiently. It can use an index of the document collection. An index in this context is a set of data structures that enables the efficient retrieval of documents that match a search criterion.

Given a query, the search engine should retrieve as many relevant documents as possible while avoiding retrieving non-relevant documents. The relevance of a document can be defined in different ways. Also, the documents included in the result can be sorted by relevance.

There are two main strategies for the implementation of an index: Inverted indices and Suffix-based indices.

An inverted index includes a vocabulary (the set of words that are indexed and that can be part of a query) and a posting or document list for each word in the vocabulary. A posting list of a word is a list of document ids corresponding to documents in which the word appears (more information can appear together with the document id, for example: position within the document, weight, or others). A common type of query is a conjunctive query. This is a query including one or more words and seeks to obtain the relevant documents that contain all the words in the query. To resolve this query, an inverted index retrieves the lists for each word and intersects them to obtain the list of documents that contain all words. This list can be further processed or sorted to reflect ranking or relevance.

Inverted indices generally require that the data can be parsed into words and that the vocabulary remains of reasonable size. Furthermore, in general they only allow for queries to full words. Because of this, they may not be suitable for use with text in some languages as well as for non-natural language databases (e.g., DNA, MIDI, source code).

Suffix-based indices are built on all suffixes of a text, and therefore do not require the concept of word and allow searching for arbitrary substrings in the text. Several types of indices fall in this category. Some implement data structures that are based on or inspired in Suffix Trees. A direct implementation of a Suffix Tree uses significant space and hence these structures encode similar information in less space at the expense of higher operation times. Examples of these structures are the Compressed Suffix Array (CSA), the Burrows-Wheeler-Transform (BWT), and Wavelet Trees.

Figure 6:
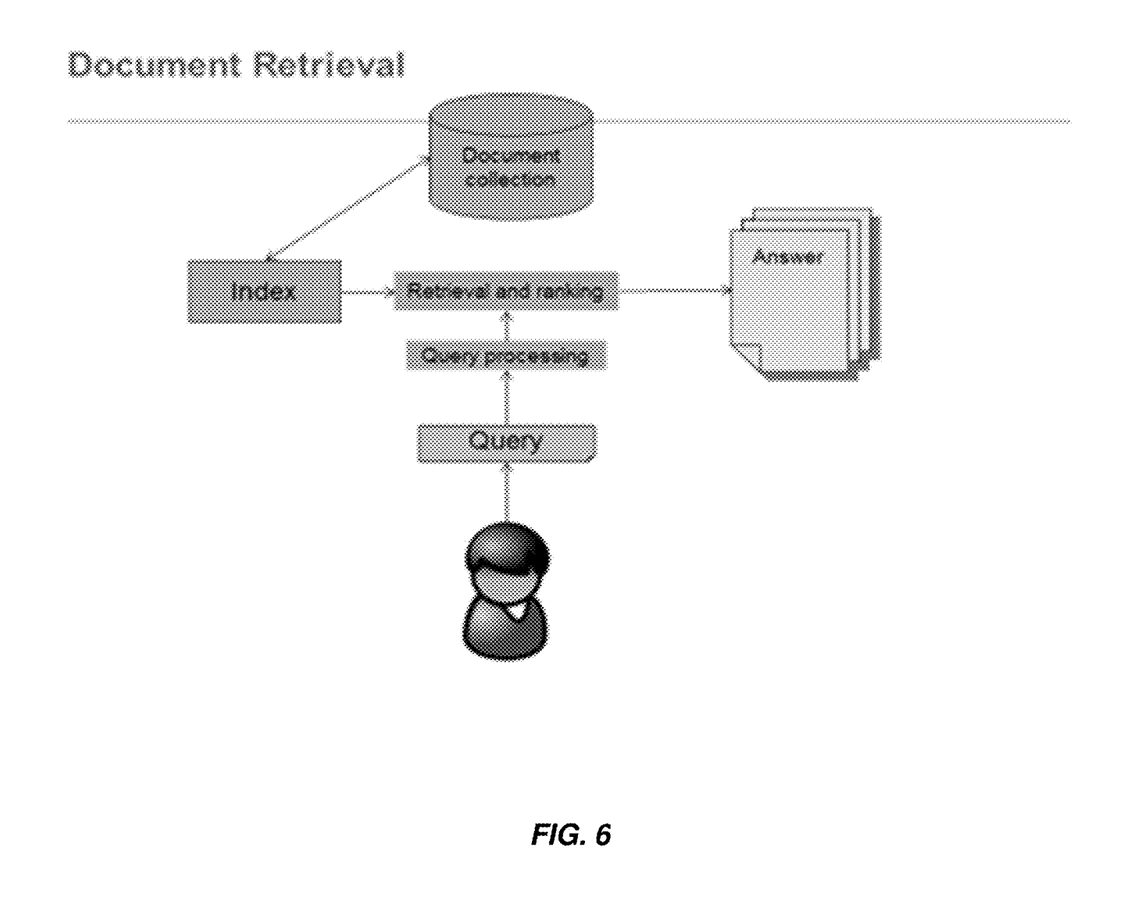
FIG. 6 is a system block diagram illustrating the document retrieval problem.
Figure 7:
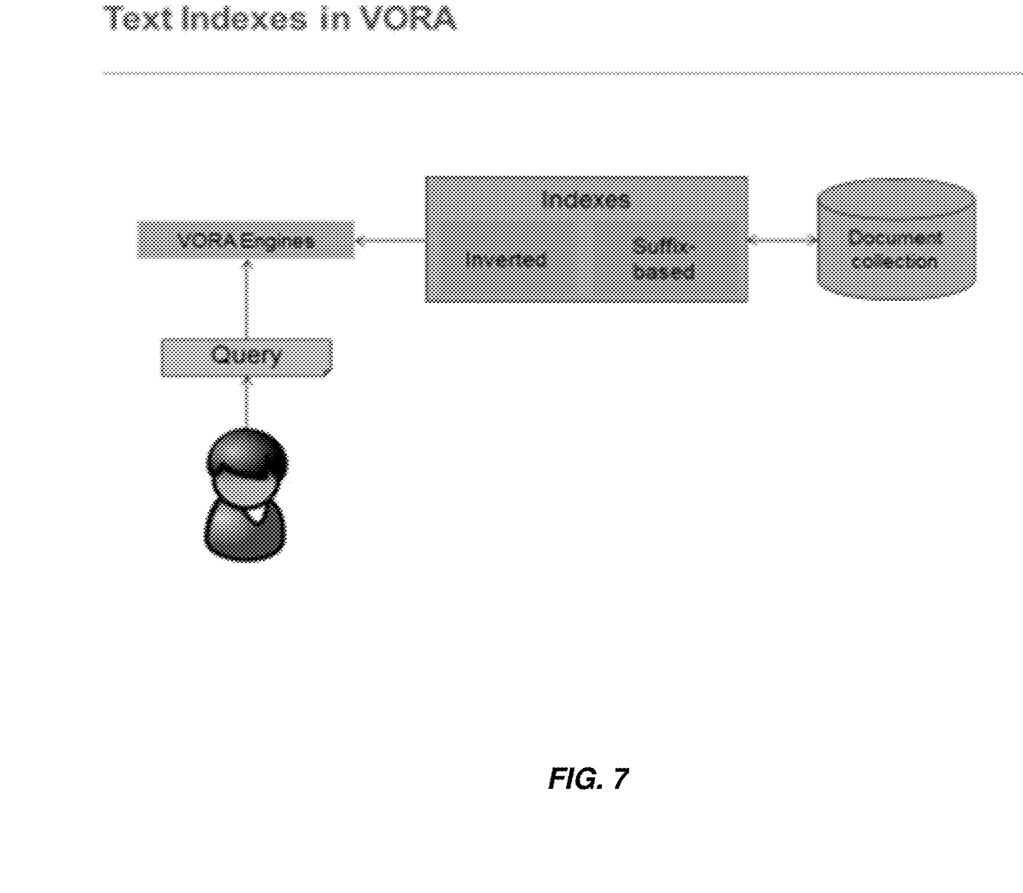
FIG. 7 is a system block diagram illustrating text indexes in a database query system.

FIG. 6 is a system block diagram illustrating the document retrieval problem and FIG. 7 is a system block diagram illustrating text indexes in a database query system. The inverted index is a library extracted from HANA and can be used directly from VORA.

The suffix-based index can be implemented in terms of different data structures. A Suffix Tree is a data structure that encodes information about all suffixes of a text. A Generalized Suffix Tree encodes information about the suffix of all texts in a document collection. For each suffix in the text collection there exists a path in the tree that leads to a node indicating the location of the suffix in the text.

A search for a pattern is carried out by following the path from the root according to each character, until either no path can be followed (the pattern is not in the collection), the pattern ends at an internal node (the pattern occurs at all locations in the subtree rooted in the node), or a leaf is reached before finishing the pattern (the occurrence of the pattern can be verified in the text at the location indicated in the leaf).

A Suffix Array stores the locations of each suffix of the collection sorted lexicographically. A search is done simulating the search in the suffix tree following each branch by binary searching in the array the interval corresponding to the each character.

The Document Listing Problem relates to enumerating the IDs of documents that contain a pattern given a query consisting of a string (the pattern). Due to the high practical space requirements of suffix trees and suffix arrays several compressed versions of these structures have been devised, yielding various space-time trade-offs. Given a query, a search is carried out in the Suffix Array representation, identifying an interval of occurrences. Then, the document reporting structures allow the efficient identification of the documents that correspond to the suffixes in the interval.

Suffix Array Representations can take several forms, such as, for example, the plain Suffix Array implementation described above as well as a Compressed Suffix Array (CSA) and an FM-Index.

With respect to the CSA, instead of storing the entire Suffix Array in plain form, a compressed version is stored, together with extra information to retrieve arty value of the array. The CSA leads to space savings at the expense of higher access time.

The CSA contains the same information as the initial Suffix Array, and it is constructed from the Suffix Array recursively using $$\left\lceil lg\left(\frac{lg(n)}{lg(\Sigma)}\right)\right\rceil$$

levels, where n is the length of the text and $\Sigma$ is the size of the alphabet.

At each level of compression, the data structure indexes half of the elements of the previous level. Start with $SA_0=SA$, where SA is the Suffix Array of length n for the entire text. At each level k, $0 \leq k < lglgn$ transform $SA_k$ into a more succinct representation storing instead a bit vector $B_k$ with a data structure allowing rank operation on it, the function $\Phi_k$ and $SA_{k+1}$ of half size of $SA_k$. At the final level $$k = \left\lceil lg\left(\frac{lg(n)}{lg(\Sigma)}\right)\right\rceil,$$

$SA_k$ is stored explicitly using n bits in total. In order to obtain the initial value of an element of the Suffix Array, apply the formula recursively $$\left\lceil lg\left(\frac{lg(n)}{lg(\Sigma)}\right)\right\rceil$$

times: $SA_k[i]=2SA_{k+1}[rank_k(\Phi_k(i))]+B_k[i]-1$, using constant time per level.

Another solution to reduce the space of the Suffix Array comes from the connection between the Burrows-Wheeler Transform (BWT) and the Suffix Array. The BWT is a permutation of the initial text T, defined as:

$$T^{BWT}[i] = \begin{cases} T[SA[i]-1], & \text{if } SA[i] > 1, \\ T[n], & \text{if } SA[i] = 1. \end{cases}$$

where T is of size n and SA is the Suffix Array of T. A property of BWT is that characters having the same context (i.e., string following them in T) are consecutive in $T^{BWT}$. Repetitions of characters in $T^{BWT}$ makes it easy to compress.

The compressibility of the BWT and the indexing properties of the Suffix Array can be combined.

Once the BWT is constructed, the initial text is discarded. To retrieve the text from the structure, it is enough to invert the BWT. For this purpose, a table LF (last to first mapping) can be used, defined such that if T[i] is permuted to $T^{BWT}[j]$ and T[i−1] to $T^{BWT}[k]$, then LF[j]=k. Therefore, the text can be retrieved backwards by printing $\$T^{BWT}[1]T^{BWT}[LF[1]]T^{BWT}[LF[LF[1]]]\ldots$ A property of LF is that it enables efficient query searches as an interval in the Suffix Array (e.g., all the corresponding suffixes in the interval start with the query). In order to store LF efficiently, it can be observed that LF[i] can be represented as the sum of the number of characters in $T^{BWT}$ that are alphabetically smaller than the character $T^{BWT}[i]$ and the number of times the character $T^{BWT}[i]$ appears in $T^{BWT}$ until position i.

For full-text indexes, search queries consist in finding the interval [s,e] in the Suffix Array such that all corresponding suffixes from the interval have the pattern as their prefix in the text. The next step is to efficiently enumerate the distinct document IDs in which the pattern occurs at least once.

A first solution uses a document array D, in which element D[i] contains the ID of the document to which the suffix at SA[i] belongs. The document listing problem is then reduced to enumerating all the different values of elements in D[s..e]. To solve this problem, another array can be introduced, called predecessor array C. This array links each position in D to the previous occurrence of the same document ID or to 0, if this is the first occurrence of the document ID in D. The solution is based on the following observation. If an ID of a document occurs in D[s..e], then its leftmost occurrence p is the one where it holds C[p]<s.

The problem is now reduced to finding all the values in D[i] in D[s..e] with i in [s..e] for which C[i]<s. In order to find these values a data structure can be used to solve Range Minimum Queries (RMQ) on C[s..e]. The next minimum value in the interval can be found in the interval and the corresponding document ID (D[i]) can be reported, until the minimum is no longer smaller than s. These document IDs are the documents where the pattern occurs at least once.

Another solution reduces the space of the previous solution and can be used for compressed full-text indexes (like Compressed Suffix Array or FM-Index). The document array and the predecessor array are replaced by more succinct data structures.

RMQ queries can be used recursively on predecessor array without accessing the array, which means it can be discarded. In order to verify whether this is the first occurrence of the document ID to report, instead of asking if C[p]<s, a bitmap to mark with 1 the document IDs that were already reported can be used.

Instead of the document array D, which is of the length of the text, a smaller array D' of length equal to the number of documents can be stored. This new array stores positions of the first character of each document in the text. It suffices to observe that D[i] is exactly the number of elements in D' that are no greater than SA[i]. Thus, using the Suffix Array, it is possible to extract the document ID for a given index.

In order to implement the above-describe text search engine functionality, several useful data structures can be implemented for efficiently enabling $Select_c(B,i)$—the position in the sequence B of the i-th occurrence of character c; $Rank_c(B,i)$—the number of times character c occurs in B[1..i]; and $RMQ_L(i,j)$—the position of a minimum value in the sequence L[i..j].

For a bit vector B, a rank operation usually refers to $Rank_1(B,i)$, i.e., finding the number of 1-bits in B[1..i], and is often written simply as Rank(B,i). For Rank operations on bit vectors we implemented the following data structure can be used. The data structure stores two levels of precomputed rank values: blocks and superblocks.

The bit array of length n is divided into blocks of size b=[log n/2]. Consecutive blocks are grouped into superblocks of equal size s=b[log n]. For each superblock j, store a number $R_s[j]$=Rank(B,j*s) representing the number of 1-bits from the start of the bit vector until the beginning of block j. For each block k of superblock j, store a number $R_b[k]$=Rank(B,k*b)−Rank(B,j*s) representing the number of 1-bits from the beginning of the superblock j until the beginning of block k. Finally, store a precomputed table indexed by bytes which allows, in 4 or 8 accesses to the table, for calculating Rank(S,i) for every block S of length b and every position i<b.

Using the above data structure, a rank query on B is then computed in constant time by the formula:

$$Rank(B,i)=R_s[i \text{ div } s]+R_s[i \text{ div } b]+Rank(B[(i \text{ div } b)*b+1 \ldots (i \text{ div } b)*b+b],i \text{ mod } b].$$

A constant select on bitmaps can be provided as described above.

For Rank and Select queries on arbitrary sequences (i.e., over a large alphabet), it is possible to construct a succinct data structure that reduces Rank/Select operations on a sequence T over a large alphabet Σ to Rank/Select operations on bitmaps.

First, it is possible to represent the given sequence T of length n as a σ×n table of 0's and 1's with rows indexed by the characters of T in alphabetical order and columns by positions of characters in the sequence. For example, entry [c,i] indicates whether c occurs in position i in the sequence (1 if c occurs in position i in T, and 0 otherwise). Let A be the bit vector of length nσ obtained by concatenating the rows of the constructed binary table. Observe that A contains exactly n 1-bits. There is a direct relation between Rank/Select operations on the sequence T and Rank/Select operations on the bit vector A:

$$Rank_c(T,i)=Rank_1(A,(c-1)n+i)-Rank_1(A,(c-1)n)$$

$$Select_c(T,i)=Select_1(A,Rank_1(A,(c-1)n)+i)$$

The operations Rank/Select on arbitrary sequences are thus reduced to Rank/Select on bitmaps. However, the bit vector A is still too big to be stored together with the data structure allowing constant Rank/Select on A. It is possible to construct a smaller bit vector that will have a direct relation between Rank/Select operations on this bit vector and Rank/Select operations on T or A.

The bit vector A of size nσ can be divided into n blocks of size σ each. The number of 1-bits in each block can be counted and stored in a new array C of length n. Thus, C[i] is the rank of block i. Observe that the sum of all elements in C is n. Instead of storing C it is possible to store a bit vector B representing the unary code of the sequence C. At this point, a smaller bit vector B of length 2n can be obtained, it suffices to find the relation between Rank/Select on B and Rank/Select on A.

It is possible to answer Rank queries on A for positions that are multiples of σ, i.e., $Rank_1(A,i\sigma)=Rank_1(B,Select_0(B,i))$. For all the other positions in A, there is need to build the following arrays. For answering Rank queries inside each block $A_k$ of A, a new array $E_k$ that stores the positions of the 1-bits in the block can be used. In the case where block $A_k$ does not contain any 1-bits, array $E_k$ is empty and it is not stored. E represents the concatenation of non-empty arrays $E_{i_1}, E_{i_2}, \ldots E_{i_s}$ in the same order as the blocks in A. Array E is of length n.

To answer a Rank query on a position i inside a block $A_k$, the current subject matter can include determining in constant time the interval [s,e] in E corresponding to the block, and searching for the two consecutive elements E[p] and E[r] of E[s..e] such that E[p]≤i≤E[r]. Finally, it suffices to binary search for the rank inside the bit sequence. B[E[p]..E[r]].

To summarize performing a constant rank on arbitrary sequences summary, storing the bit vector B of length 2n and its data structure for constant Rank/Select on B, the array E of length n, it is possible to answer in constant time Rank operations on the initial sequence T.

RMQ (Range Minimum Query) includes: given an array C of length n, construct a data structure that allows finding the position of the minimum element in any interval C[s..e] that takes constant time per query. First, reduce RMQ on an arbitrary array C to an RMQ on a special type of arrays, denoted $RMQ^{\pm}$. Then solve $RMQ^{\pm}$.

To reduce RMQ construct temporarily the Cartesian tree of array C. The Cartesian tree is a binary tree where each node of the tree corresponds to an element of C and contains the index of the element in C. The root of the tree corresponds to minimum element in the array (say at index i) and its left and right subtrees are the Cartesian trees of in C[1..i−1] and C[i+1..n] respectively. Add a leaf to each node, containing the value of the corresponding element in C.

Represent the tree as an array P of length 4n, using the symbols '(' and ')'. Traverse the Cartesian tree of C in-order, writing a '(' in P each time a node is first reached and a ')' when the traversal comes back to it after traversing its (possibly empty) subtrees.

To answer an RMQ on C[s..e], it is necessary to convert an index i to the element C[i] into the position j of the '(' in P of the leaf whose parent has label i. Because each leaf has no child, it is represented by '0' in P. Moreover, because leaves appear in P in the order of depth-first search, the order of the leaves in P is determined by the parents' labels. The parenthesis array P can be stored as a bit vector with 0 corresponding to '(' and 1 corresponding to ')'.

To find the LCA (Lowest Common Ancestor) between two nodes in a parenthesis sequence, consider an array P' (which is not stored). P'[i] is defined as the difference between the number of '(' in P[1..i] and the number of ')' in P[1..i] minus 1, which can be calculated using constant rank operations on the bitmap P. Thus, there is no need to store P' explicitly, since P'[i] can be found in constant time.

Then LCA query is reduced to RMQ on P'. P' has the property that the difference between two consecutive elements is 1 or −1. Such an array is called plus-minus-one array and the RMQ on such an array is denoted by $RMQ_{P'}^{\pm}$.

The RMQ=i on C[s..e] is reduced to the following:

$x = Select_0(P,s)$ and $y = Select_0(P,e)$ $z = RMQ_{P'}^{\pm}(x,y)$

If $P[z+2]=$')' then $f=z+1$ else $f=z-1$ $i = Rank_0(P,f)$

A solution to $RMQ^{\pm}$ can then be found.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LED) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Figure 8:
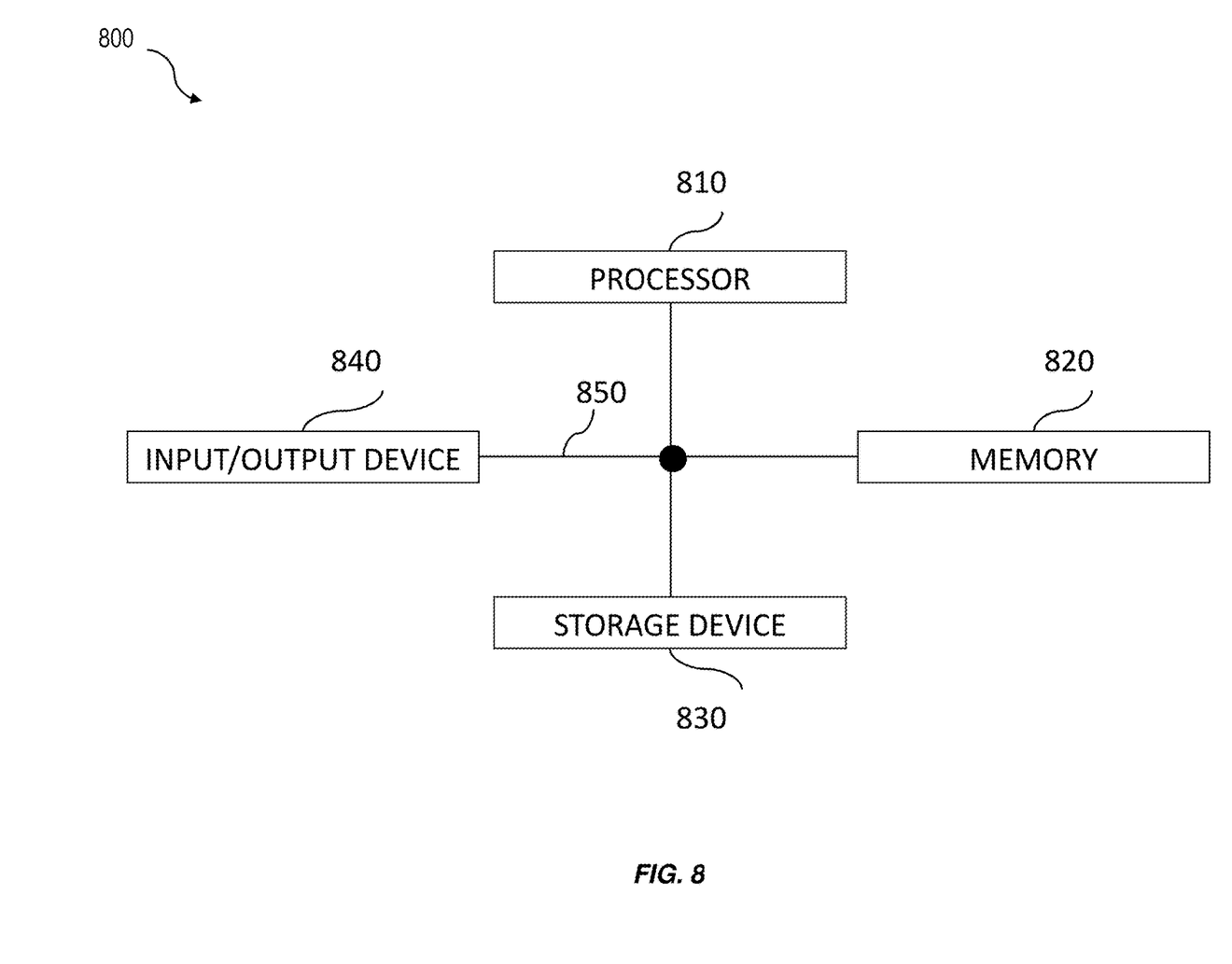
FIG. 8 is a system block diagram illustrating an example computing system.

In some implementations, the current subject matter can be configured to be implemented in a system 800, as shown in FIG. 8. The system 800 can include one or more of a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising: accessing a bit vector having a bit vector length; generating, using the bit vector, a data structure including: a first level of superblocks including large superblocks and small superblocks; a second level of blocks including large blocks and small blocks, each block associated with one of the superblocks; a third level of sub-blocks, each sub-block associated with a block; and the large superblocks each have a length greater than a first constant that is independent of the bit vector length and the large blocks each have a length greater than a second constant that is independent of the bit vector length; storing the data structure; executing a select operation on the bit vector, the select operation operating on the bit vector, data indicative of a bit-type, and an occurrence value, the select operation returning an index of an occurrence of the bit-type in the bit vector that equals occurrence value wherein the occurrence of the bit-type characterizes a number of times the bit-type occurs within a sequence of bits characterized by the bit vector, the bit vector characterizing a text document the execution of the select operation utilizing the data structure and performed as part of a text query; wherein blocks associated with large superblocks characterize explicit local large superblock indexes of the bit-type of the bit vector, blocks associated with small superblocks characterize locations of sub-blocks, the sub-blocks associated with the large blocks characterize explicit local large block indexes of the bit-type of the bit vector, and sub-blocks associated with small blocks characterize a cumulative number of occurring bit-types in a portion of the bit vector; and wherein a number of bits within the large superblocks is greater than a number of bits within the small superblocks.

2. The method of claim 1, wherein the first level of superblocks is represented as at least a first level array storing a location of a predetermined occurrence of a bit-type in the bit vector, the second level of blocks is represented as at least a plurality of second level arrays, and the third level of sub-blocks is represented as at least a plurality of third level arrays.

3. The method of claim 1, wherein generating the data structure includes:
   determining a boundary of each superblock in the bit vector as a predetermined occurrence of the bit-type in the bit vector;
   determining whether each superblock is large or small based on whether a given superblock has a length greater than the first constant that is independent of the bit vector length;
   storing explicit indexes of the bit-type of each large superblock in each associated block;
   determining a boundary of each block associated with a small superblock in the bit vector;
   determining whether each block associated with the small superblocks is large or small based on whether a given block has a length greater than the second constant that is independent of the bit vector length;
   storing explicit indexes of the bit-type of each large block in each associated sub-block; and
   storing, in each respective sub-block associated with each respective large block, a cumulative number of occurring bit-types in an associated portion of the bit vector.

4. The method of claim 3, wherein the predetermined occurrence of the bit-type in the bit vector defining the boundary of each superblock is $2^{12}$, the first constant that is independent of the bit vector length is equal to $2^{20}$, and the second constant that is independent of the bit vector length is equal to $2^{14}$.

5. The method of claim 1, wherein the bit-type is a 0 bit or a 1 bit, and wherein the bit vector is an array of 0 and 1 bits.

6. The method of claim 1, wherein at least one of the accessing, the generating, and the storing is performed by at least one data processor forming part of at least one computing system.

7. A method comprising: receiving data characterizing a bit vector and a bit-select value; executing a select operation on the bit vector by at least searching a data structure for an index of a bit-select value occurrence of a bit-type in the bit vector, the select operation operating on a bit vector, data indicative of the bit-type, and the bit-select value occurrence, the select operation returning the index of the bit-select value occurrence of the bit-type in the bit vector that equals the bit-select value occurrence, wherein the bit-select value occurrence of the bit-type characterizes a number of times the bit-type occurs within a sequence of bits characterized by the bit vector, the bit vector characterizing a text document, the searching utilizing the data structure and performed as part of a text query, the data structure including: a first level of superblocks including large superblocks and small superblocks; a second level of blocks including large blocks and small blocks, each block associated with one of the superblocks; a third level of sub-blocks, each sub-block associated with a block; the large superblocks each have a length greater than a first constant that is independent of a bit vector length and the large blocks each have a length greater than a second constant that is independent of the bit vector length; and providing the index of the bit-select value occurrence of the bit-type; wherein blocks associated with large superblocks characterize explicit local large superblock indexes of the bit-type of the bit vector, blocks associated with small superblocks characterize locations of sub-blocks, the sub-blocks associated with the large blocks characterize explicit local large block indexes of the bit-type of the bit vector, and sub-blocks associated with small blocks characterize a cumulative number of occurring bit-types in a portion of the bit vector; and wherein a number of bits within the large superblocks is greater than a number of bits within the small superblocks.

8. The method of claim 7, wherein the first level of superblocks is represented as at least a first level array storing a location of a predetermined occurrence of the bit-type in the bit vector, the second level of blocks is represented as at least a plurality of second level arrays, and the third level of sub-blocks is represented as at least a plurality of third level arrays.

9. The method of claim 8, wherein the searching includes:
determining if the bit-select value is contained in the first level array;
determining, using the first level array, a superblock having the bit-select value occurrence of the bit-type;
determining one of the plurality of second level arrays associated with the determined superblock;
determining if the bit-select value is contained in the determined one of the plurality of second level arrays;
determining one of the plurality of the third level arrays associated with the determined second level array having the bit-select value occurrence of the bit-type; and
determining an index of the bit-select value occurrence of the bit-type from the determined one of the plurality of the third level arrays.

10. The method of claim 7, wherein a bit-select operation is performed during a text search engine operation.

11. The method of claim 7, wherein at least one of the receiving, the searching, and the providing is performed by at least one data processor forming part of at least one computing system.

12. A system comprising: at least one data processor; and memory storing instructions, which when executed by the at least one data processor, implement operations comprising: receiving data characterizing a bit vector and a bit-select value, executing a select operation on the bit vector by at least searching a data structure for an index of a bit-select value occurrence of a bit-type in the bit vector, the select operation operating on a bit vector, data indicative of the bit-type, and the bit-select value occurrence, the select operation returning the index of the bit-select value occurrence of the bit-type in the bit vector that equals the hit-select value occurrence, wherein the bit-select value occurrence of the bit-type characterizes a number of times the bit-type occurs within a sequence of bits characterized by the bit vector, the bit vector characterizing a text document, the searching utilizing the data structure and performed as part of a text query, the data structure including: a first level of superblocks including, large superblocks and small superblocks; a second level of blocks including large blocks and small blocks, each block associated with one of the superblocks; a third level of sub-blocks, each sub-block associated with a block; the large superblocks each have a length greater than a first constant that is independent of a bit vector length and the large blocks each have a length greater than a second constant that is independent of the bit vector length; and providing the index of the bit-select value occurrence of the bit-type; wherein blocks associated with large superblocks characterize explicit local large super-block indexes of the bit-type of the bit vector, blocks associated with small superblocks characterize locations of sub-blocks, the sub-blocks associated with the large blocks characterize explicit local large block indexes of the bit-type of the bit vector, and sub-blocks associated with small blocks characterize a cumulative number of occurring bit-types in a portion of the bit vector; and wherein a number of bits within the large superblocks is greater than a number of bits within the small superblocks.

13. The system of claim 12, wherein the first level of superblocks is represented as at least a first level array storing a location of a predetermined occurrence of the bit-type in the bit vector, the second level of blocks is represented as at least a plurality of second level arrays, and the third level of sub-blocks is represented as at least a plurality of third level arrays.

14. The system of claim 13, wherein the searching includes:
determining if the bit-select value is contained in the first level array;
determining, using the first level array, a superblock having the bit-select value occurrence of the bit-type;
determining one of the plurality of second level arrays associated with the determined superblock;
determining if the bit-select value is contained in the determined one of the plurality of second level arrays;
determining one of the plurality of the third level arrays associated with the determined second level array having the bit-select value occurrence of the bit-type; and
determining an index of the bit-select value occurrence of the bit-type from the determined one of the plurality of the third level arrays.

15. The system of claim 12, wherein a bit-select operation is performed during a text search engine operation.

16. The method of claim 1, wherein generating the data structure includes:
- determining a boundary of each superblock in the bit vector as a predetermined occurrence of a bit-type in the bit vector;
- determining whether each superblock is large or small based on whether a given superblock has a length greater than the first constant that is independent of the bit vector length;
- storing explicit indexes of the bit-type of each large superblock in each associated block;
- determining a boundary of each block associated with a small superblock in the bit vector;
- determining whether each block associated with the small superblocks is large or small based on whether a given block has a length greater than the second constant that is independent of the bit vector length;
- storing explicit indexes of the bit-type of each large block in each associated sub-block; and
- storing, in each respective sub-block associated with each respective large block, a cumulative number of occurring bit-types in an associated portion of the bit vector; and
- wherein a bit-type is a 0 bit or a 1 bit, and wherein the bit vector is an array of 0 and 1 bits.

17. The method of claim 1, wherein the select operation is executing as part of a text search query by a text search engine forming part of an enterprise database system executing queries on database tables.

18. The method of claim 1, wherein a time to execute the select operation is independent of the bit-vector length.

19. The method of claim 1, wherein a time to execute the select operation does not increase with an increase in the bit vector length.

* * * * *